(12) United States Patent  (10) Patent No.: US 6,344,910 B1
Cao  (45) Date of Patent: Feb. 5, 2002

(54) OPTICAL PERFORMANCE MONITOR

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/401,735

(22) Filed: Sep. 23, 1999

(51) Int. Cl.⁷ ............................................. H04B 10/08
(52) U.S. Cl. ...................................... 359/110; 359/124
(58) Field of Search ................................ 359/110, 124, 359/173, 177

(56) References Cited

U.S. PATENT DOCUMENTS 5,790,285 A  *  8/1998  Mock ......................... 359/110
6,055,078 A  *  4/2000  Chen et al. .................. 359/110

* cited by examiner

Primary Examiner—Kinfe-Michael Negash

(74) Attorney, Agent, or Firm—Sawyer Law Group LLP

(57) ABSTRACT

The present invention provides a method and system for monitoring a composite optical signal in an optical network. The method includes separating the composite optical signal into a plurality of subsets, each subset including a plurality of data points, and detecting the plurality of data points. The method and system in accordance with the present invention utilizes an optical performance monitor which is able to obtain the entire spectrum in a matter of milliseconds. The preferred embodiment of the optical performance monitor utilizes a plurality of separator modules to separate sets of data points of the optical signal and transfer these data points to a device for analysis. The method and system of the present invention is faster than conventional performance monitors. Because the optical performance monitor of the present invention allows the spectrum to be obtained in fractions of a second, real-time performance monitoring is provided. Furthermore, because a plurality of data points are time multiplexed onto each and every optical detector via optical switch settings, the optical performance monitor of the present invention is cost effective. The optical performance monitor may be combined with another device in the optical network to control the performance of the network.

15 Claims, 14 Drawing Sheets

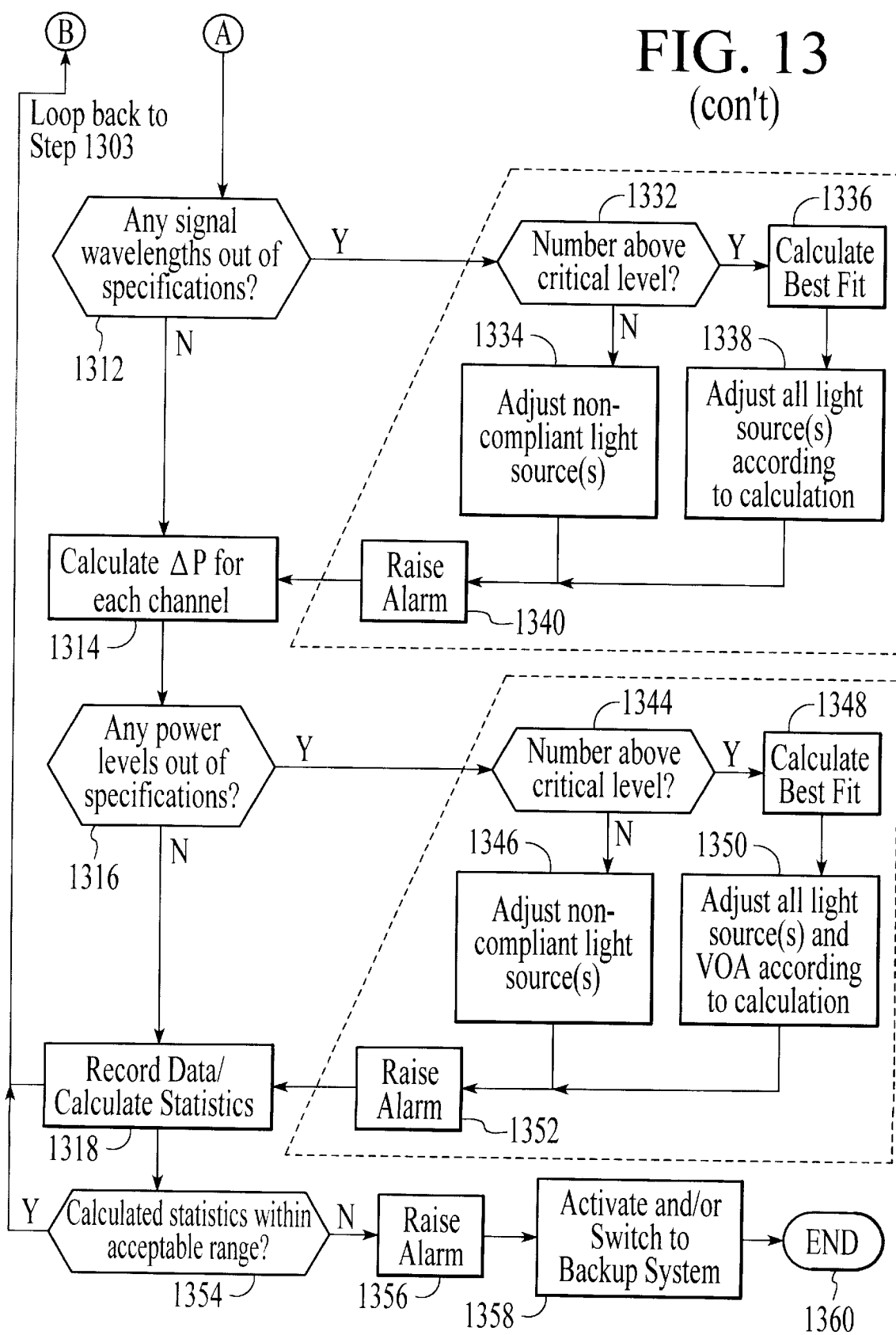
FIG. 13 (con't)

OPTICAL PERFORMANCE MONITOR

FIELD OF THE INVENTION

The present invention relates to fiber optic networks, and more particularly to monitoring the performance of fiber optic networks.

BACKGROUND OF THE INVENTION

Fiber optic networks are becoming increasingly popular for data transmission due to their high speed, high capacity capabilities. As the traffic on fiber optic networks increases, monitoring and management of the networks become increasingly more significant issues. To monitor the network, the spectral characteristics of the composite signal at particular points in the network must be determined and analyzed. This information may then be used to alter the performance of the network if the signal characteristics are less than optimal.

FIG. 1 illustrates one conventional method of determining the spectral characteristics of the composite signal in a fiber optic network utilizing a Fabry-Perot interferometer. The Fabry-Perot interferometer 10 is a mechanical device which scans wavelengths of an optical signal. The Fabry-Perot interferometer 10 comprises two glass plates 11 and 12 exactly parallel and placed at a distance L from each other. The glass plate 11 is a fixed mirror with a partially reflective coating 13 on the side facing glass plate 12. The glass plate 12 is a scanning mirror with a partially reflective coating 14 on the side facing glass plate 11. The two glass plates 11, 12 together form a cavity 15 of length L. An optical fiber 16 inputs collimated polychromatic light into the Fabry-Perot interferometer 10 through the outside face of glass plate 11. Those wavelengths of the light which consist of integral numbers of half wavelengths which can fit in the cavity 15 exit the interferometer 10 from the side opposite optical fiber 16 and are sampled by the photodetector 17. The photodetector 17 can then output the wavelengths for analysis, as illustrated in box 20. All other wavelengths of the light are not transmitted through Fabry-Perot interferometer 10 to receivers 17 due to destructive interference.

However, the Fabry-Perot interferometer 10 can only scan one wavelength at a time. To obtain the entire spectrum of the signal, the Fabry-Perot interferometer must scan by causing the second glass plate 12 to travel back and forth, thereby varying the length L of the cavity 15. The length L is varied so that each wavelength of the spectrum can be sampled by the photodetector 17. Precision mechanical positioners 18 are used to move the second glass plate 12. This scanning can require up to several seconds to accomplish due to the fact that the Fabry-Perot interferometer 10 is a mechanical device. The response time of the conventional system is thus slow. Also, the conventional system is difficult to align since the glass plates 11, 12 must be exactly parallel in order to obtain the correct spectrum. Fabry-Perot interferometers are well known in the art and will not be further discussed here.

Accordingly, there exists a need for method and system for a performance monitor in a fiber optic network which is faster than conventional performance monitors. The performance monitor should be just as accurate as conventional performance monitors and allow the spectrum to be obtained in fractions of a second, allowing for real-time performance monitoring. The present invention addresses such a need.

SUMMARY OF THE INVENTION

The present invention provides a method and system for monitoring a composite optical signal in an optical network. The method includes separating the composite optical signal into a plurality of subsets where each subset includes a plurality of data points, and detecting the plurality of data points. The method and system in accordance with the present invention utilizes an optical performance monitor which is able to obtain the entire spectrum in a matter of milliseconds and is limited by optical switching speed or computing power or speed. The system can be readily improved, if necessary, to provide faster measurement speed, resolution, or accuracy. The preferred embodiment of the optical performance monitor utilizes a plurality of channel separator or dense wavelength division multiplexer modules to separate sets of data points of the optical signal and transfer these data points to a device for analysis. The method and system of the present invention is faster than conventional performance monitors. Because the optical performance monitor of the present invention allows the spectrum to be obtained in fractions of a second, real-time performance monitoring is provided. Furthermore, because a plurality of data points are time multiplexed onto each and every optical detector via optical switch settings, the method and system of the present invention is cost effective. The optical performance monitor may be combined with another device in the optical network to control the performance of the network.

DETAILED DESCRIPTION

The present invention provides a method and system for monitoring a composite optical signal in a fiber optic network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A method and system in accordance with the present invention utilizes an optical performance monitor (OPM) which is able to obtain the entire spectrum of signals in a matter of milliseconds. To more particularly describe the features of the present invention, please refer to FIGS. 2 through 13 in conjunction with the discussion below.

Figure 2:
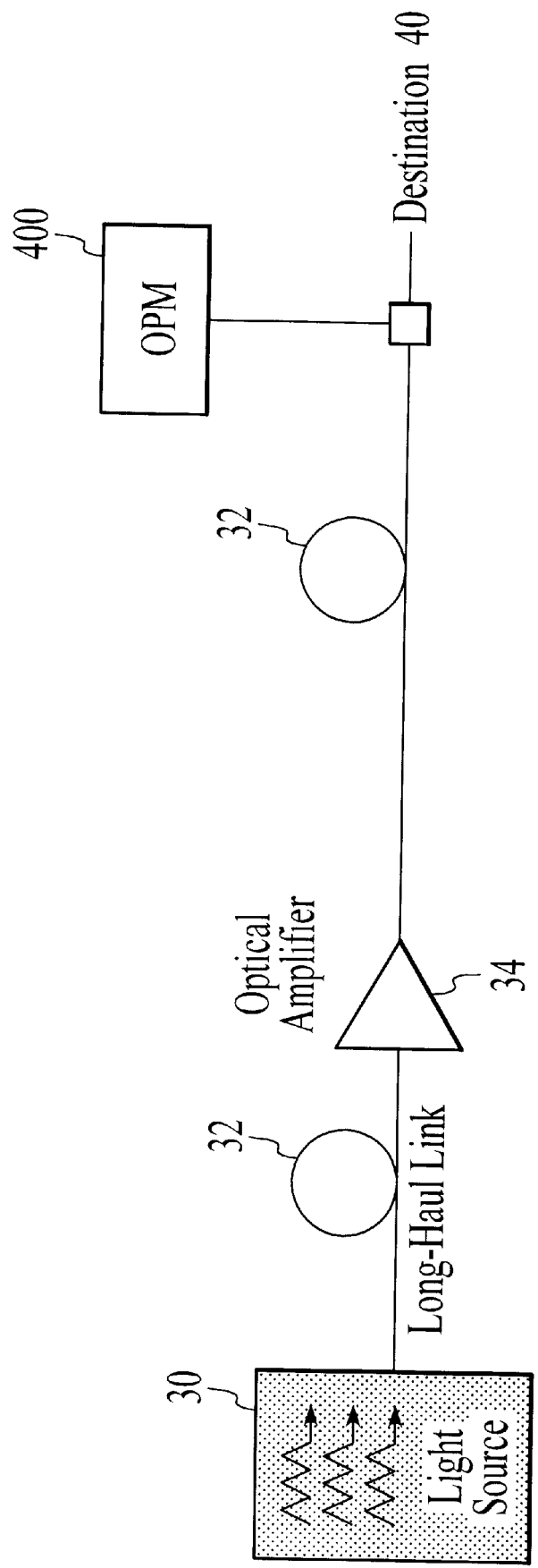
FIG. 2 illustrates an optical network utilizing an optical performance monitor in accordance with the present invention.

FIG. 2 illustrates a wavelength division multiplexed (WDM) optical network which utilizes an OPM in accordance with the present invention. The multichannel optical network comprises a bank of light sources 30 which provides the light carrier wavelengths upon which the signals are modulated. The signals then travel along optical fibers 32 toward a destination node 40. Each carrier wavelength, or channel, carries one signal in the WDM system. The totality of multiplexed signals carried by an optical fiber 32 is herein referred to as a composite signal. Occasionally, the signals must be amplified by an optical amplifier 34, such as an Erbium Doped Fiber Amplifier (EDFA) due to attenuation of the signal strength. Typically, an optical signal must be amplified after it travels approximately 80 km. The OPM 400 may be located at various locations within the network for the purpose of analyzing the performance of the network. In the preferred embodiment, the OPM 400 is illustrated as being located between the optical amplifier 34 and the destination node 40, but one of ordinary skill in the art will understand that the OPM 400 may be placed elsewhere in the network without departing from the spirit and scope of the present invention.

Figure 3:
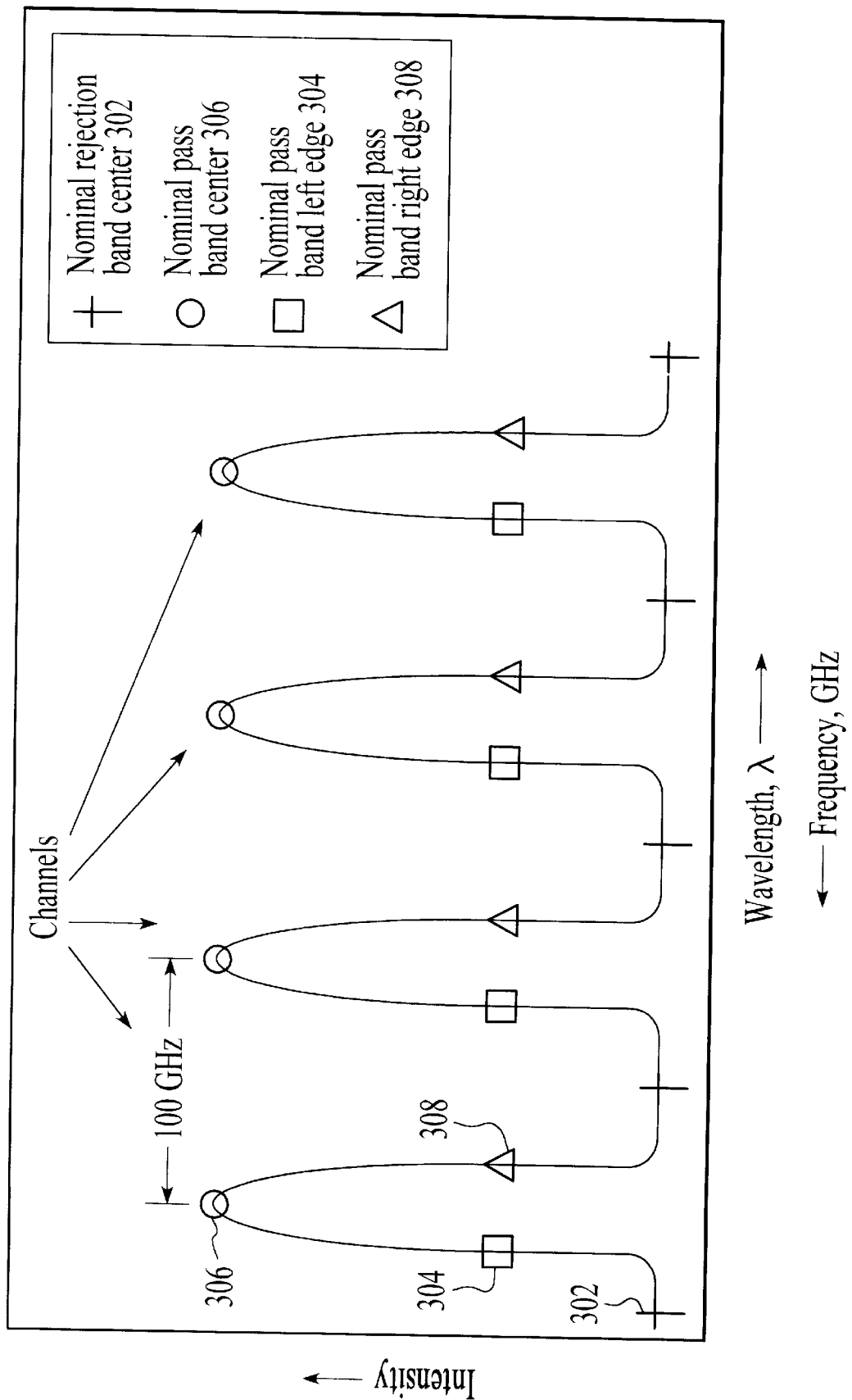
FIG. 3 illustrates a point sampling technique used in the method and system of the present invention.

The method and system in accordance with the present invention obtains information concerning the spectrum of the composite signal by utilizing point sampling. FIG. 3 illustrates the concept of point sampling used by the OPM in accordance with the present invention. For monitoring and control of the composite signal, the intensity of the light at various data points in its spectrum is needed. At least four sets of points are needed. These four points per channel are illustrated in FIG. 3. One set of data points 302 provide the nominal isolation band centers of the channels. A second set of data points 304 provide the left edges of the nominal pass bands. A third set of data points 306 provide the nominal pass band centers, and a fourth set of data points 308 provide the right edge of the nominal pass bands. With these four sets of data points, the maximum wavelength and intensity for each channel may be obtained. Also obtained is the number of channels in the signal and the signal-to-background ratio, also referred to as the optical signal-to-noise ratio (OSNR).

Figure 1:
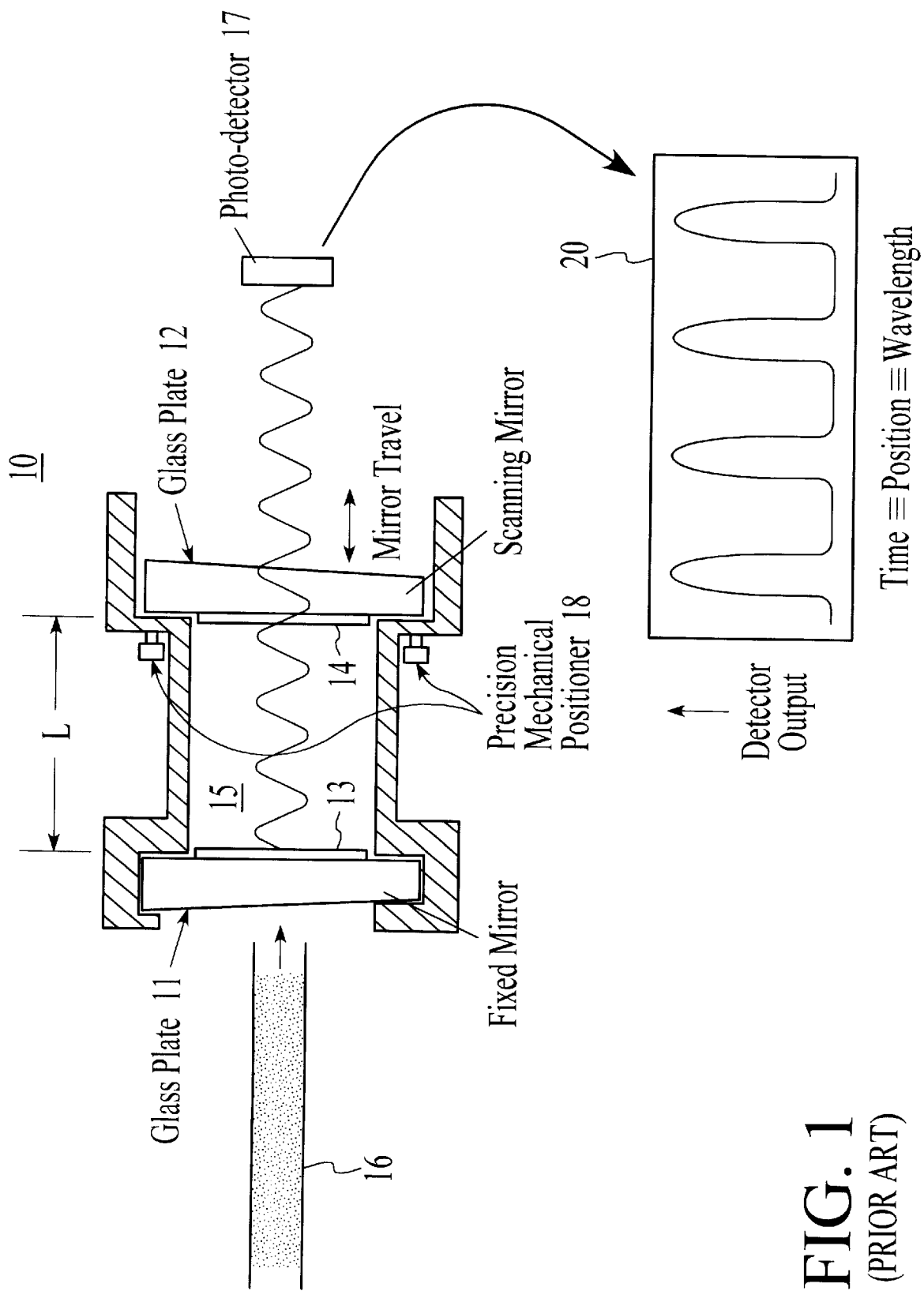
FIG. 1 illustrates a conventional method of determining the spectral characteristics of the composite signal in a fiber optic network utilizing a Fabry-Perot interferometer.

To obtain data from these data points, conventional photodetectors may be used, such as the photodetector 17 in FIG. 1. However, a photodetector would be needed for each data point for each channel. Thus, the required number of photodetectors would be 4 times the number of channels. With 64 to 80 channels per link in the network, 256 to 320 separate photodetectors for each OPM are needed per link, making the monitoring and control of the network costly.

Figure 4:
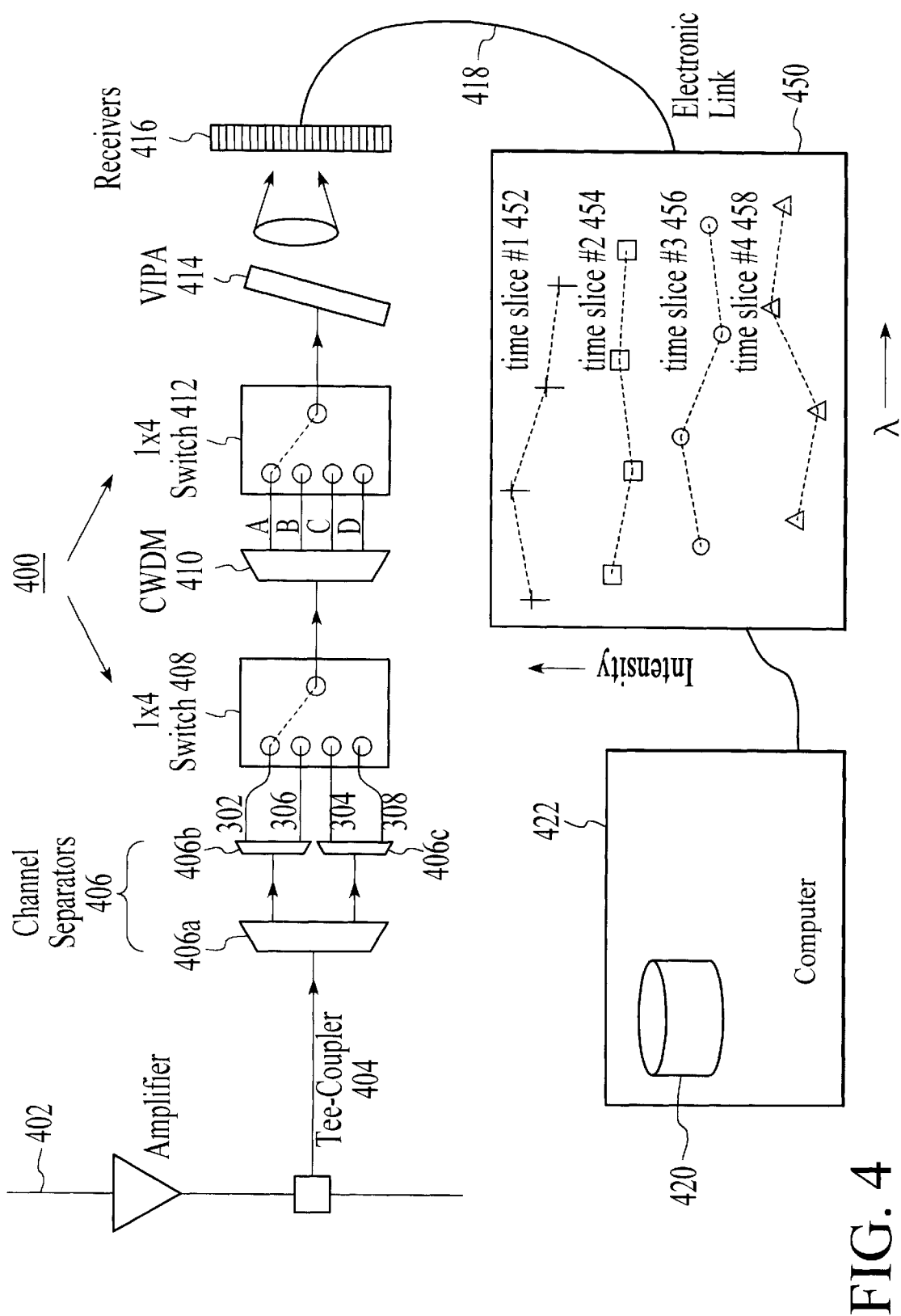
FIG. 4 illustrates a preferred embodiment of an optical performance monitor in accordance with the present invention.

Instead of using separate photodetectors, the method and system in accordance with the present invention uses an OPM to obtain the data points. FIG. 4 illustrates a preferred embodiment of an OPM in accordance with the present invention. A sample of the signal is branched off from the main loop 402 through a Tee-coupler 404, and enters the OPM 400. The OPM 400 comprises cascaded channel separator modules 406 which function as a dense wavelength division multiplexer (DWDM). This DWDM separates the spectral data points into four independent subsets of data points, each such subset comprising every fourth data point of the original data point set. The channel separator modules 406 are configured in a multi-stage parallel cascade configuration. This configuration is disclosed in copending U.S. Patent Application entitled "Fiber Optic Dense Wavelength Division Multiplexer Utilizing a Multi-Stage parallel Cascade Method of Wavelength Separation", Ser. No. 09/130,386, filed on Aug. 6, 1998. Applicant hereby incorporates this patent Application by reference.

Figure 5:
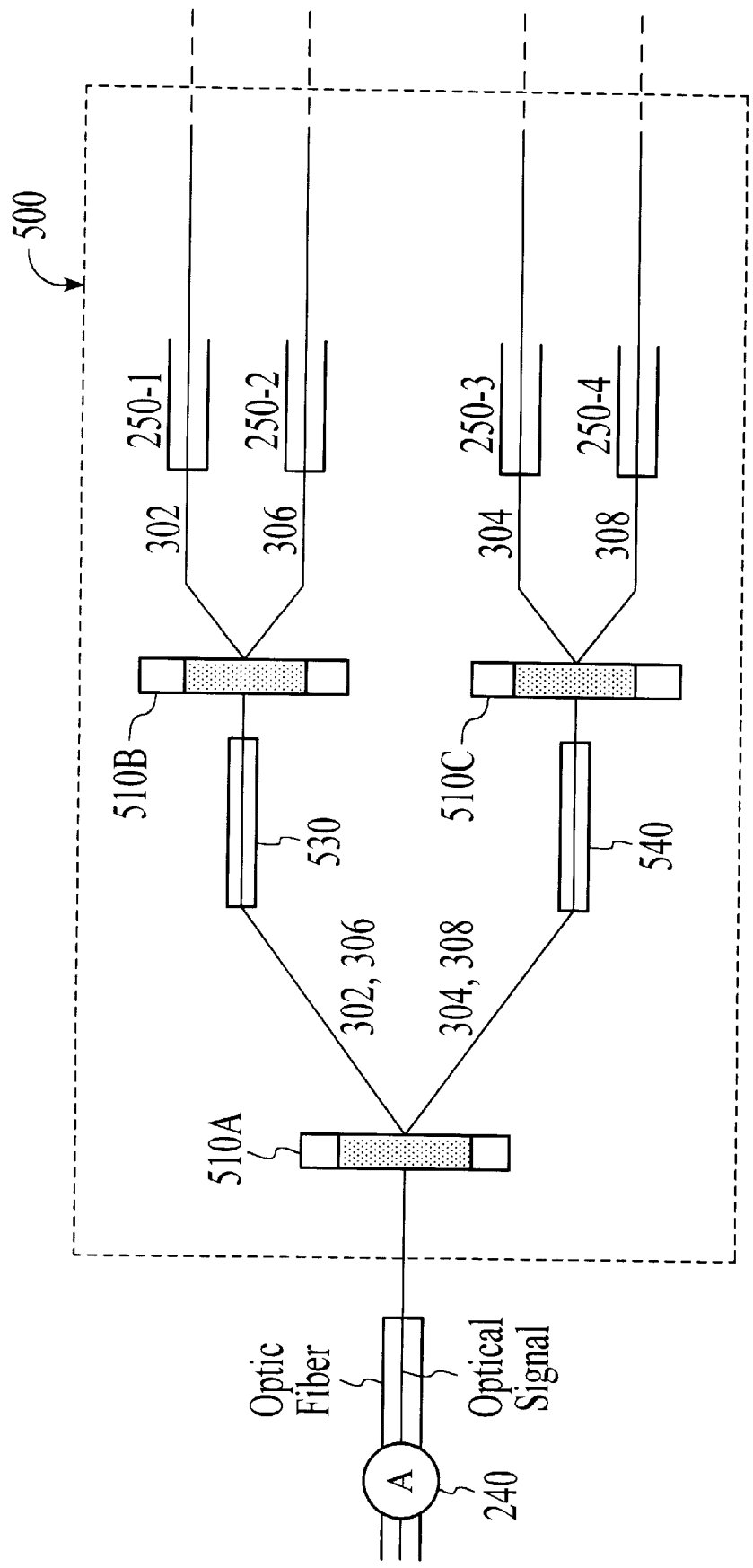
FIG. 5 illustrates a preferred embodiment of a multi-stage cascade parallel configuration of separator modules in accordance with the present invention.

FIG. 5 is a block diagram illustrating a preferred embodiment of a DWDM with a multi-stage parallel cascade configuration of separators as disclosed in U.S. Pat. application Ser. No. 09/130,386. A composite optical signal containing channels $\lambda_1 - \lambda_n$ enters the DWDM 500 through node A (240). The composite signal passes through a separator 510A. The separator 510A divides the signal into two subsets of data points, one subset containing data points 530, such as data points 302 and 306, and the other subset containing other data points 540, such as data points 304 and 308. These subsets are each passed through another separator 510B–510C which divides them further into subsets such that only one group of data points is outputted to each output pathway or port, 250-1 through 250-4. Thus, data points 302 are outputted to port 250-1, data points 306 to port 250-2, data points 304 to port 250-3, and data points 308 to port 250-4.

For example, returning to FIG. 3, assume the spacings of the channels are 100 GHz. The spacing between each data point on a channel is thus 25 GHz. The first channel separator module 406a can then be configured to separate the data points along the spectrum of the composite signal so that the spacing of the resulting data points are at 50 GHz, resulting in one subset of data points containing data points 302 and 306, and another subset of data points containing data points 304 and 308. Each of these two subsets are then input to another channel separator module 406b and 406c. Modules 406b and 406c can be configured to separate the subsets so that the resulting subsets comprise data points spaced at 100 GHz, thereby dividing the data points further into subsets of data points 302, 304, 306, 308. Thus, the channel separator modules 406 have four outputs, each one containing a subset of the data points. For example, the first output could contain the data points 302, the second output could contain the data points 304, the third output could contain the data points 306, and the fourth output could contain the data points 308.

Returning to FIG. 4, the outputs of the channel separator modules 406 enter a 1×4 optical switch 408 which selects each subset of data points in turn. Each subset of data points is then divided into coarse bands so that only a certain number of data points of each subset are inputted to the Virtually Imaged phased Array 414 (VIPA) at a time. The necessity for dividing the data points into bands is due to the functioning of the VIPA 414, which is described below in conjunction with FIGS. 6–9. A Coarse Wavelength Division Multiplexer 410 (CWDM) is used to accomplish this division. In the preferred embodiment, each subset of data points are divided into four different bands. The CWDM 410 functions as a set of four bandpass filters with the pass band of each such filter narrower than the spectral range of any of the data point subsets 302, 304, 306 and 308. Preferably, the band width of each of the bands A–D output from CWDM 410 is less than the free spectral range, $\Delta\lambda$ of VIPA 414 as discussed further below. Also, the separation between the pass bands of any two spectrally adjacent pairs of the bands A–D is greater than or equal to $\Delta\lambda$.

The coarse bands enter another ×4 optical switch 412 which selects each coarse band in turn and inputs it into the VIPA 414, which provides luminous fluxes which are spatially distinguishable. Each luminous flux contains the plurality of data points within one of the subsets 302, 304, 306 or 308 of data points contained within one of the pass bands A–D. The VIPA 414 separates these data points so they can be detected by the plurality of detectors or receivers 416. This is repeated for each band for each subset of data points. The result is four partial spectra 452–458 for each band, as illustrated in box 450. For instance, suppose switch 412 is set so as to select Band A output from CWDM 410. Then, switch 408 is cycled through each of its four settings so as to send only data points from subset 302, 304, 306 and 308, respectively, through the subsequent optical components and finally to the receives 416. With switch 412 set to Band A, for each such setting of switch 408, only the partial spectrum of data points of each subset contained within Band A is sent to the receivers 416. Thus, partial spectrum 452 contains the data points 302 that are within Band A; partial spectrum 454 contains data points 304 within Band A; partial spectrum 456 contains data points 306 within Band A; and partial spectrum 458 contains data points 308 within Band A. The partial spectra 452–458 are then sent via electronic link 418 to a device to be analyzed. This sequence is repeated, in turn, for switch 412 set to each one of the bands B–D. In the preferred embodiment, the data points are analyzed by an embedded Digital Signal processing firmware which produces near real-time digital output. Note that other sequences of switch settings are also possible. For instance, switch 408 could be set to transmit data points 302 while switch 412 is cycled through each of the four bands A–D, etc.

The box 450 of FIG. 4 illustrates one possible measured set of data points for one setting of optical switch 412—for instance, so as to select Band A output from the CWDM 410. Then, each of the time slices 452, 454, 456 and 458 of box 450 represents the set of data points output to receiver array 416 for one particular setting of switch 408 when switch 412 is set to transmit Band A. There will be a similar set of data points to those illustrated in box 450 for the remaining three settings of switch 412, with each such set of points occupying a different spectral region along the wavelength ($\lambda$) axis. Each group of near-vertically aligned points in box 450 of FIG. 4 is detected by a single detector or receiver element in the plurality of receivers 416. Thus, although sixteen data points are illustrated in box 450, only four receivers are required. These same four receivers will detect an additional sixteen data points for each remaining setting of switch 412. Since there are sixteen unique combinations of settings of the two switches, 408 and 412, sixteen data points are therefore time multiplexed onto each receiver 416. The value of each data point is related to the average optical power detected by the particular receiver generating that data point over the course of the measurement time with a particular set of switch settings. Additionally, each receiver, together with its associated electronics, can determine the signal's bit transfer rate (if any) of the channel corresponding to the particular data point being measured.

Figure 6:
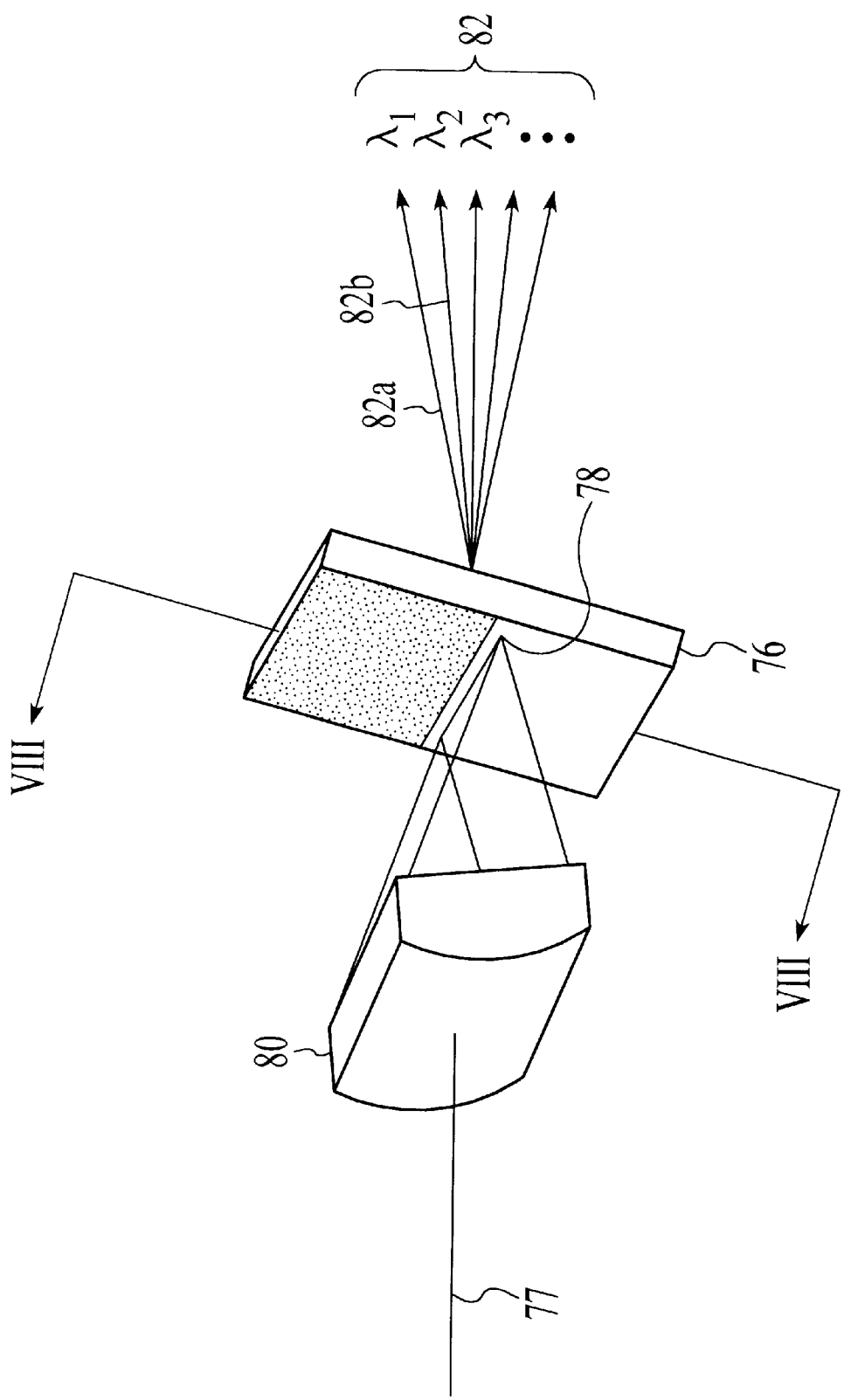
FIG. 6 illustrates a preferred embodiment of the virtual imaged phased array in accordance with the present invention.

FIG. 6 illustrates a preferred embodiment of the VIPA in accordance with the present invention. The VIPA is disclosed in co-pending U.S. Patent Application entitled "Virtually Imaged phased Array (VIPA) Having a Varying Reflectivity Surface to Improve Beam Profile", Ser. No. 09/114,071, filed on Jul. 13, 1998.

The VIPA 76 is preferably made of a thin plate of glass. An input light 77 is focused into a line 78 with a lens 80, such as a semi-cylindrical lens, so that input light 77 travels into VIPA 76. Line 78 is hereinafter referred to as "focal line 78". Input light 77 radially propagates from focal line 78 inside VIPA 76. VIPA 76 then outputs a luminous flux 82 of collimated light, where the output angle of luminous flux 82 varies as the wavelength of input light 77 changes. For example, when input light 77 is at a wavelength $\lambda_1$, VIPA 76 outputs a luminous flux 82a at wavelength $\lambda_1$ in a specific direction. When input light 77 is at a wavelength $\lambda_2$, VIPA 76 outputs a luminous flux 82b at wavelength $\lambda_2$ in a different direction. Therefore, VIPA 76 produces luminous fluxes 82a and 82b which are spatially distinguishable from each other. If input light 77 includes both wavelengths $\lambda_1$ and $\lambda_2$, then VIPA 76 will simultaneously output both luminous fluxes 82a and 82b.

Figure 7:
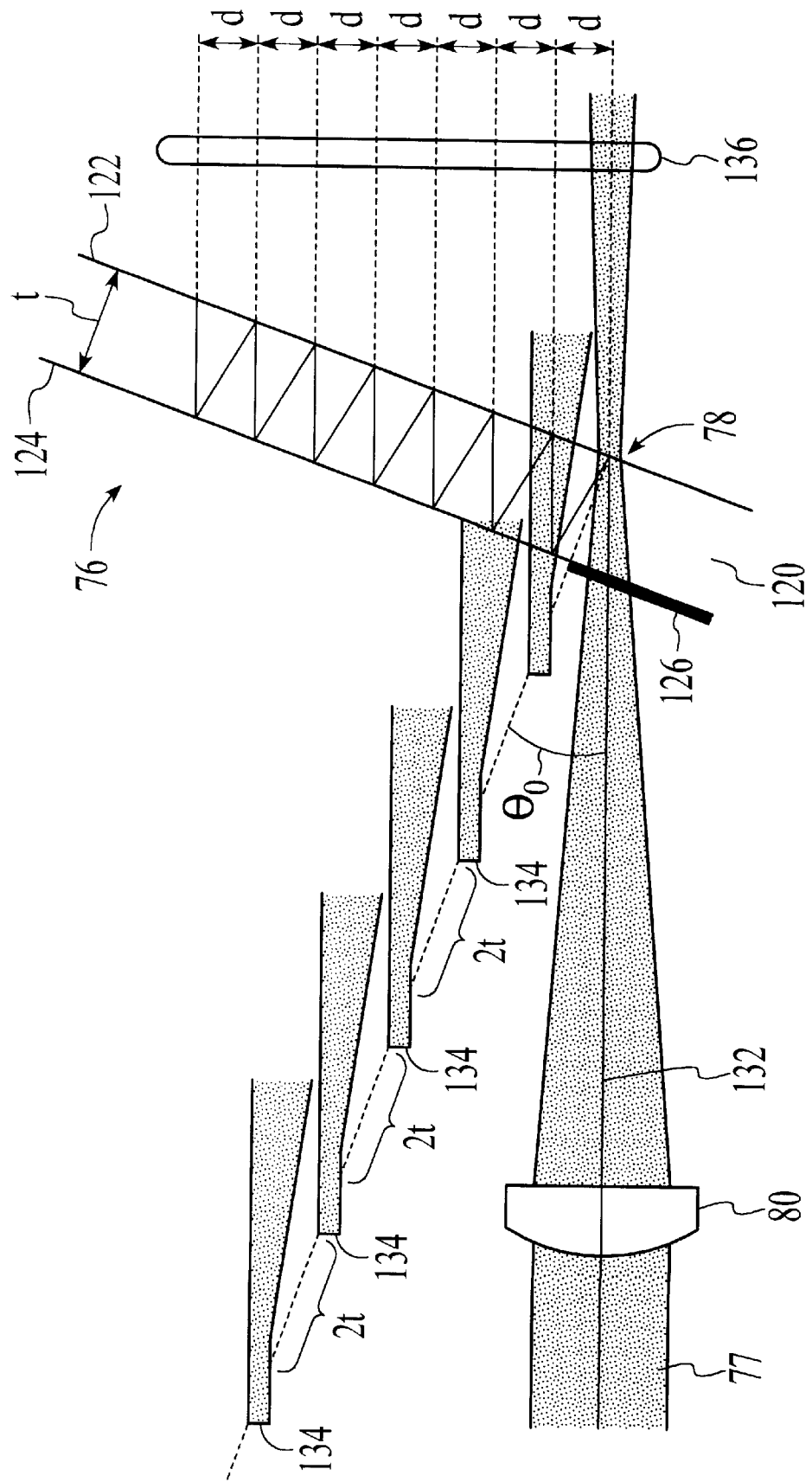
FIG. 7 illustrates in more detail the preferred embodiment of the virtual imaged phased array in accordance with the present invention.

FIG. 7 is a detailed diagram illustrating the preferred embodiment of VIPA 76. VIPA 76 includes a plate 120 made of, for example, glass, and having reflecting films 122 and 124 thereon. Reflecting film 122 preferably has a reflectance of approximately 95% or higher, but less than 100%. Reflecting film 124 preferably has a reflectance of approximately 100%. A radiation window 126 is formed on plate 120 and preferably has a reflectance of approximately 0%. Although the reflectivity of reflecting film 122 is illustrated as 95%, this reflectivity is not limited to this value and can be a different constant value or can vary along the length of reflecting film 122 provided that enough light is reflected from the film 122 to allow multiple reflections between reflecting film 122 and reflecting film 124.

Input light 77 is focused into focal line 78 by lens 80 through radiation window 126, to undergo multiple reflection between reflecting films 122 and 124. Focal line 78 is preferably on the surface of plate 120 to which reflecting film 122 is applied. Thus, focal line 78 is essentially line focused onto reflecting film 122 through radiation window 126. The width of focal line 78 can be referred to as the "beam waist" of input light 77 as focused by lens 80. Thus, the embodiment of the present invention as illustrated in FIG. 5 focuses the beam waist of input light 77 onto the far surface (that is, the surface having reflecting film 122 thereon) of plate 120. By focusing the beam waist on the far surface of plate 120, the present embodiment of the present invention reduces the possibility of overlap between (i) the area of input light 77 as it travels through radiation window 126, and (ii) the area of light on reflecting film 124 when input light 77 is reflected for the first time by reflecting film 124. It is desirable to reduce such overlap to ensure proper operation of the VIPA.

In FIG. 7, there is a small tilt angle, $\theta_o$, between the normal to the surface of plate 120 and the optical axis 132 of input light 77. Assuming the reflectivity of reflecting film 122 is 95%, upon the first reflection off a reflecting film 122, 5% of the light passes through reflecting film 122 and then diverges after the beam waist, and 95% of the light is reflected towards reflecting film 124. After being reflected by reflecting film 124 for the first time, the light again hits reflecting film 122 but is displaced by an amount d. Then, 5% of the light passes through reflecting film 122. In a similar manner, the light is split into many paths with a constant separation d. The beam shape in each path forms so that the light diverges from a plurality of virtual images 134 of the beam waist. Virtual images 134 are located at constant spacing 2t along the line that is normal to plate 120, where t is the thickness of plate 120. The positions of the beam waists and virtual images 134 are self-aligned, and there is no need to adjust individual positions. The lights from virtual images 134 interfere with each other and form collimated light 136 with propagates in a direction that changes in accordance with the wavelength of input light 77.

The spacing between light paths is $d=2t \sin \theta_o$, and the difference in path lengths between adjacent beams is $2t \cos \theta_o$. The angular dispersion is proportional to the ratio of these two numbers, namely $\cot\theta_o$. As a result, a VIPA produces a significantly large angular dispersion.

Figure 8:
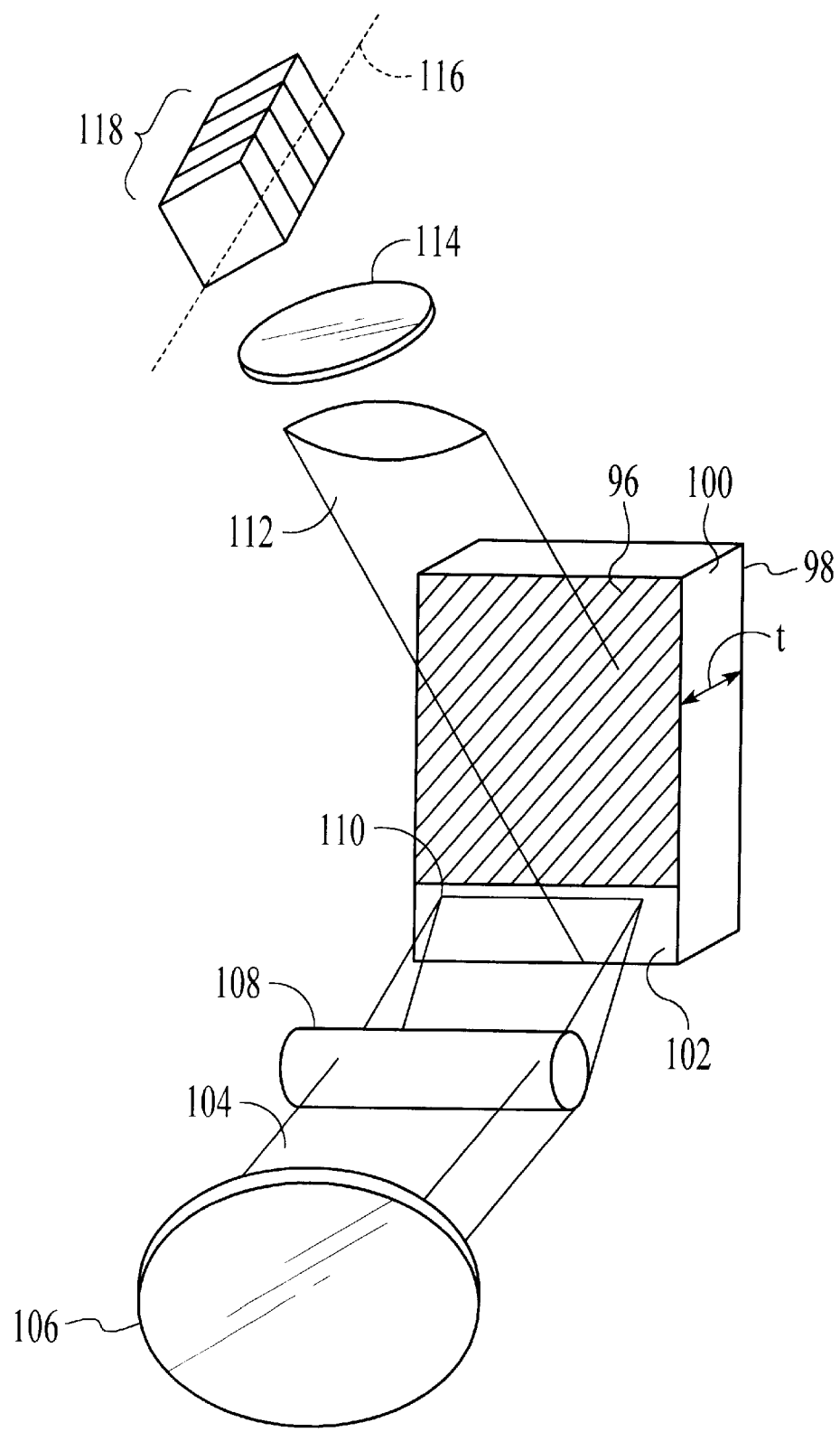
FIG. 8 illustrates the virtual imaged phased array as used with a receiver in accordance to the present invention.

FIG. 8 is a diagram illustrating a VIPA as used with a receiver, according to an additional embodiment of the present invention. Multiple-layer reflecting films 96 and 98 are applied on both sides of the VIPA 100 made of a plate of glass having parallel sides and a thickness, t, of, for example, 100 μm. It is preferable for VIPA 100 to have a thickness in the range of 20 to 2000 μm. Reflecting films 96 and 98 are preferably multiple-layer, high-reflectance interference films.

The reflectance of reflecting film 98 is approximately 100%, and the reflectance of reflecting film 96 is approximately 95%. However, the reflectance of reflecting film 96 is not limited to 95% and can be a different constant value or can vary along its length provided that enough light is reflected from reflecting film 96 to allow multiple reflections between reflecting films 96 and 98. Preferably, the reflectance of reflecting film 96 is in the range of 80% to a few percentages less than 100%. Moreover, the reflectance of reflecting film 98 is not limited to 100%, this should be high enough to allow multiple reflections between reflecting films 96 and 98.

The radiation window 102 receives input light and is disposed on the same surface as reflecting film 96 on VIPA 100. Radiation window 102 can be formed by a film having approximately 0% reflectance on the surface of VIPA 100. The boundary between radiation window 102 and reflecting film 96 is preferably a straight line.

The input light is output from, for example, an optical fiber (not illustrated) before being received by collimating lens 106. Collimating lens 106 converts the input light into parallel beams 104 which are then received by cylindrical lens 108. Cylindrical lens 108 focuses parallel beams 104 into a focal line 110 on radiation window 102. Focal line 110 is positioned close to and parallel with the straight line boundary between reflecting film 96 and radiation window 102. In this manner, input light enters VIPA 100 via radiation window 102.

The optical axis of input light 102 is at a tilt angle with respect to the normal to reflecting film 96 so the input light will not escape from VIPA 100 via the radiation window 102 after entering VIPA 100.

Once inside VIPA 100, the input light experiences multiple reflection between reflecting films 96 and 98. Each time the input light is incident on reflecting film 96, approximately 95% of the light is reflected towards reflecting film 98 and approximately 5% of the light passes through reflecting film 96 to form an output light. Multiple reflections between reflecting films 96 and 98 cause a plurality of output lights to be formed. The plurality of output light interfere with each other to form a luminous flux 112 having a propagation direction which depends on the wavelength of input lights.

Luminous flux 112 is then collected by a lens 114, which focuses luminous flux 112 at a collection point. The collection point moves along a straight line path 1 16 for different wavelengths of input light. For example, as the wavelength of the input light increases, the collection point is moved farther along straight line path 116. A plurality of receivers 18 are arranged on straight line path 1 16 to receive the focused luminous flux 112. Therefore, each receiver 118 can be positioned to receive luminous flux corresponding to a specific wavelength.

By controlling the distance t between the two surfaces of the VIPA with reflecting films, the phase difference of light reflected between the reflecting films or reflecting surfaces can be shifted by predetermined amounts, thereby realizing excellent environmental resistance. Moreover, the above embodiments of the present invention experience only a small change in optical characteristics depending on the optical polarization.

Figure 9:
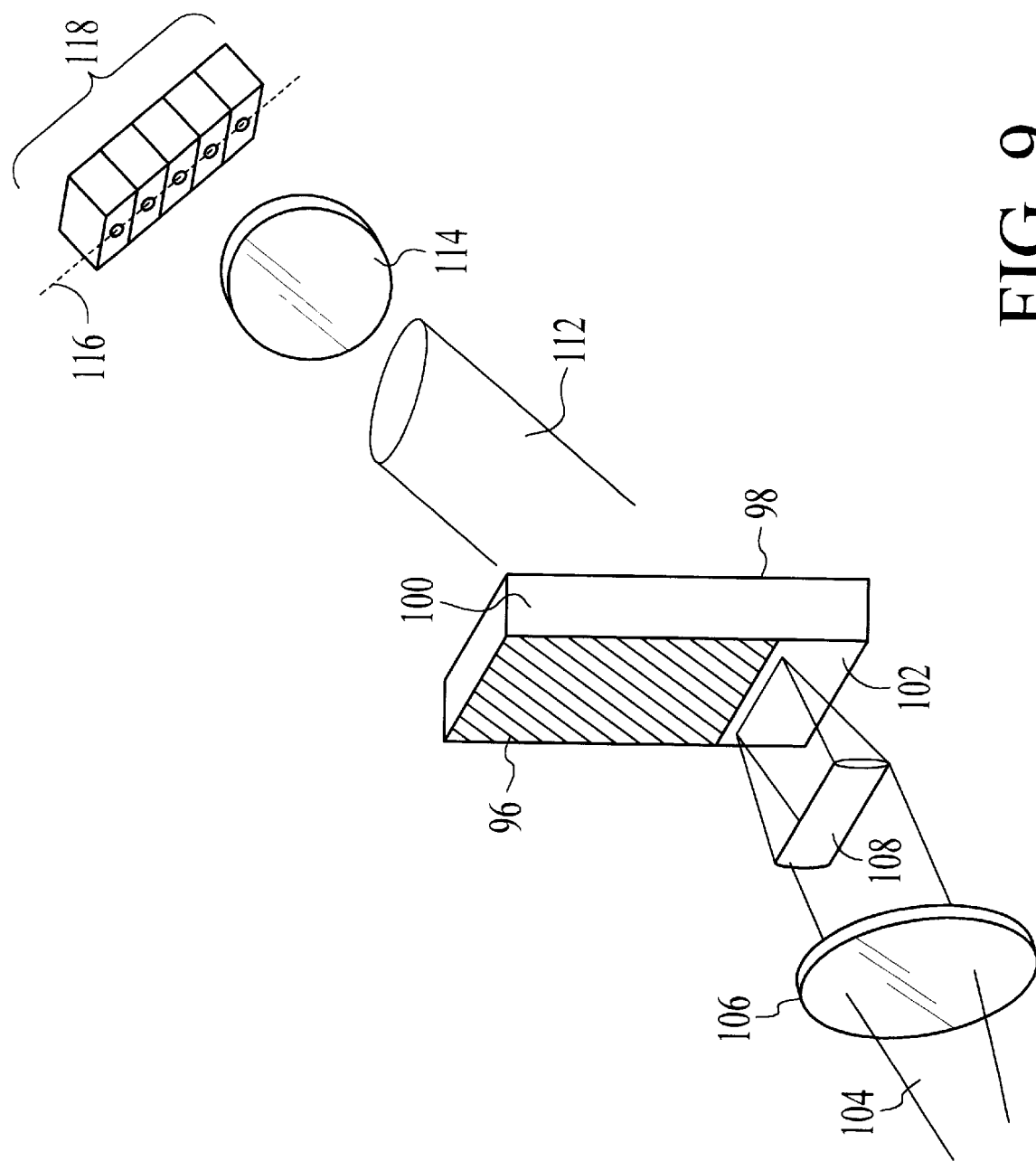
FIG. 9 illustrates the virtual imaged phased array as used with a receiver in accordance to an additional embodiment of the present invention.

FIG. 9 is a diagram illustrating a VIPA 100 as used with a receiver, according to an additional embodiment of the present invention. The VIPA illustrated in FIG. 9 is similar to the VIPA 100 illustrated FIG. 8, except that the reflectances of reflecting films 96 and 98 are reversed. More specifically, in the VIPA 100 illustrated in FIG. 9, reflecting film 98 has a reflectance of approximately 95% and reflecting film 96 has a reflectance of approximately 100%. Luminous flux 112 is formed through interference of output light travelling through reflecting film 98. Thus, the input light enters one side of VIPA 100, and luminous flux 112 is formed on the opposite side of VIPA 100. Otherwise, the VIPA illustrated in FIG. 9 operates in a similar manner as to the VIPA illustrated in FIG. 8.

Either of the VIPA and receiver embodiments illustrated in FIGS. 8 and 9 may be utilized as the VIPA 414 and receiver array 416 of the OPM 400 of FIG. 4. It is to be noted that, because the functioning of the VIPA relies on interference phenomena of multiple light paths, each VIPA will, in general be associated with a certain free spectral range, FSR or Δλ. Thus, for every receiver element 118 of either FIGS. 8 or 9, if a light of wavelength λ is directed to said receiver element, then lights of wavelengths λ+nΔλ (n an integer) will also be directed to the same receiver element. Therefore, the input to a VIPA, such as VIPA 414 of FIG. 4 must be limited to certain restricted bandwidths, such as those of Bands A–D, that are less than Δλ. Otherwise, the wavelengths of the signal begins to overlap, compromising the receivers' 416 ability to distinguish between the wavelengths.

Figure 10:
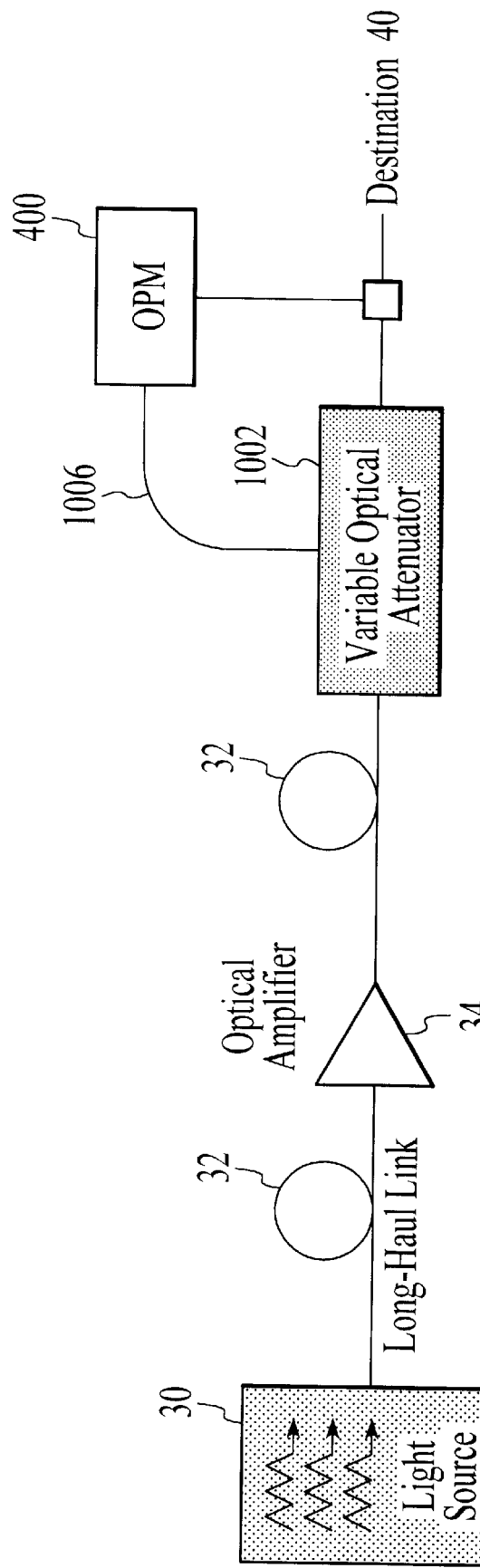
FIG. 10 illustrates an optical network utilizing the optical performance monitor with a variable optical attenuator in accordance with the present invention.

The optical performance monitor of the present invention may be used with a variable optical attenuator (VOA) or a gain flattening filter or device (GFD). The variable optical attenuator performs real-time uniform gain dampening on all channels. The GFD performs real-time selective dampening of channels which are overamplified or otherwise too intense. FIG. 10 illustrates an optical network which utilizes either a VOA or a GFD together with an OPM in accordance with the present invention. The optical network is the same as the network illustrated in FIG. 2 except the OPM 400 is coupled to the VOA 1002 or GFD via a communications link 1006. The VOA 1002 is capable of attenuating the gain of the optical signal in real time and attenuating all of the channels simultaneously. Alternatively, the VOA 1002 may be comprised of a plurality of optical attenuators wherein the optical power of each signal channel is controlled by one of the optical attenuators. The GFD performs a similar function for channels whose signals are too strong. The OPM 400 gathers the data points, and with analysis of these data points, the amount of required attenuation and/or the identities of the channels to be attenuated are determined. The VOA 1002 is then automatically adjusted accordingly, via a communications link 1006.

Although the OPM of the present invention is disclosed as being combined with a VOA and a GFD, one of ordinary skill in the art will understand that the OPM may be combined with any device in the optical network without departing from the spirit and scope of the present invention. For example, the data points provided by the OPM may be collected and stored into a database 420 (FIG. 4), which may reside on a computer 422 or some other device. The data points in the database 420 may then be used to derive various information concerning the network, such as the amount of network traffic during a particular time interval, data bit transfer rates, the allocation of channels according to wavelength, the wavelength drift of each source or channel, and fluctuations in power of any or all channels. The data points may also be used to detect the failing of devices in the network, such as a transmitter or repeater failure or even drift of the OPM itself. This information may then be used to adjust device(s) in the network to obtain a desired level of performance.

Figure 11:
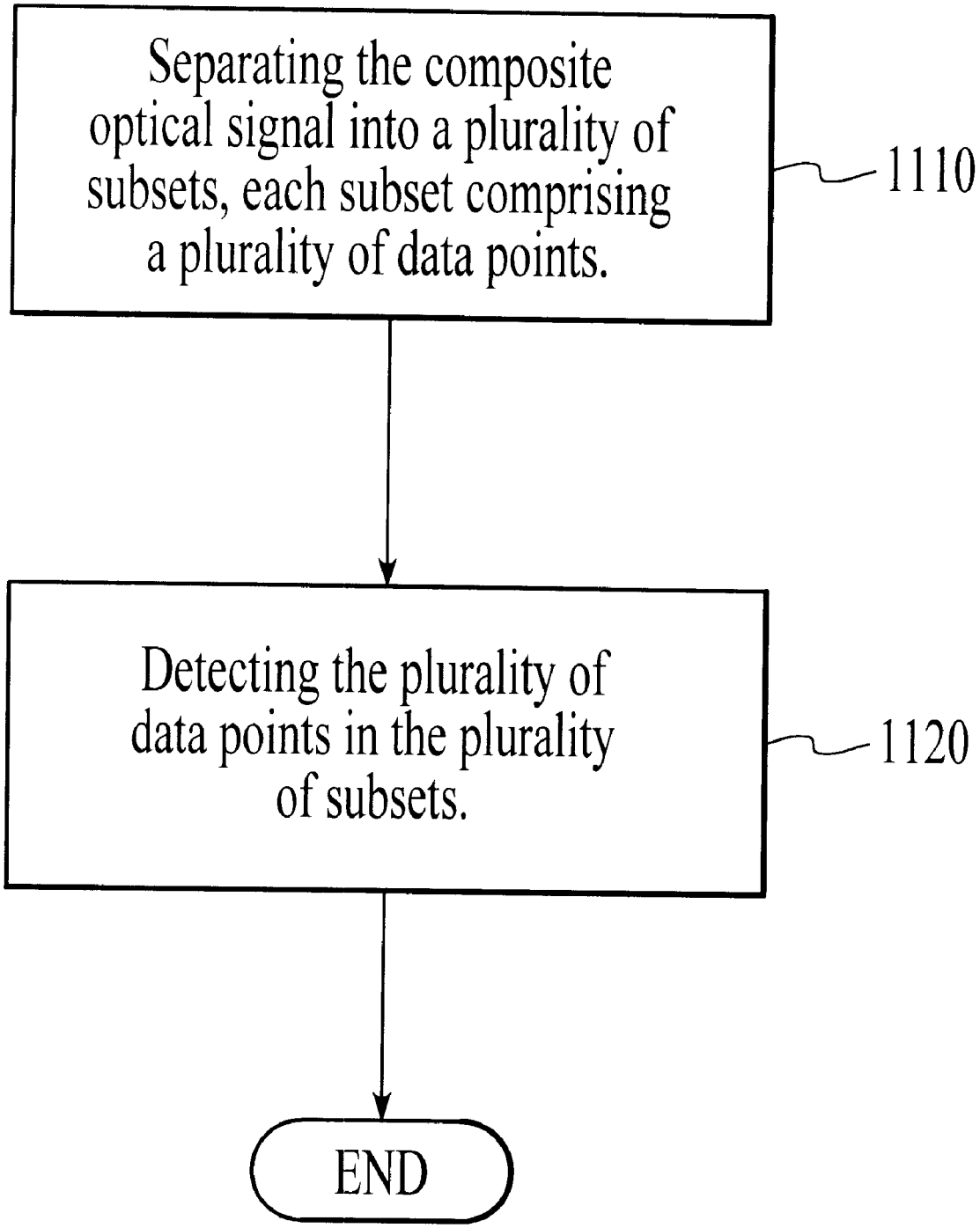
FIG. 11 is a flow chart illustrating a preferred embodiment of a method for monitoring the performance of an optical network in accordance with the present invention.

FIG. 11 is a flow chart illustrating a preferred embodiment of a method for monitoring an optical signal in accordance with the present invention. In the preferred embodiment, the OPM 400 of the present invention is used. First, the composite optical signal is separated into a plurality of subsets, each of the plurality of subsets comprising a set of data points from the composite optical signal, via step 1110. In the preferred embodiment, the composite optical signal is separated by the combination of the cascaded channel separator modules 406 and the 1×4 switch 408, as described above. Next, each of the plurality of subsets is detected, via step 1120. In the preferred embodiment, the data points in the subsets are detected by the combination of the CWDM 410, the 1×4 switch 412, the VIPA 414, and the receivers 416, also as described above.

Changes in the wavelengths or optical power levels of signal carrying channels determined by the OPM 400 may be due to a number of factors. These factors may include drift of the transmitters or optical components of the optical communications network or may be due to drift of the OPM 400 itself. Therefore, a real-time calibration method is required so as to correct for drift of the OPM 400.

Figure 12:
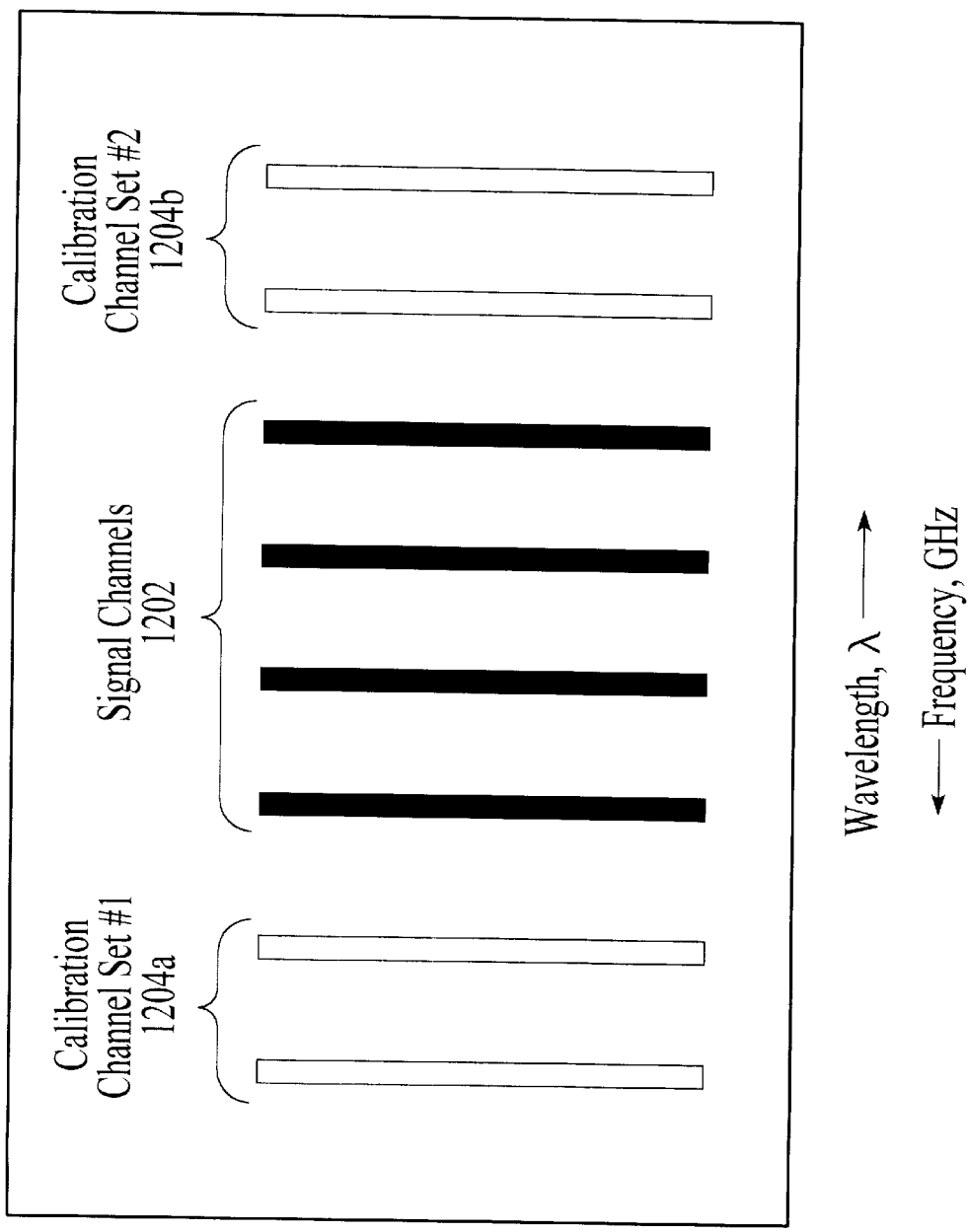
FIG. 12 illustrates a method for calibrating the wavelength scale of the optical performance monitor in accordance with the present invention using calibration channels multiplexed together with signal channels.

FIG. 12 illustrates a method for calibrating the OPM in accordance with the present invention using calibration channels. As shown in FIG. 12, the information or signal channel band 1202 is comprised of the plurality of channels that carry signals within the lightwave communications system and is part of the composite signal. Additionally, disposed to the short wavelength and the high wavelength side of the information channel band 1202 are, respectively, a first 1204a and a second 1204b calibration channel set (or band). The two sets 1204a–1204b of calibration channels are multiplexed together with the set 1202 of information carrying channels such that they propagate along the same optical pathways as these signal channels 1202. The calibration channels 1204a–1204b do not carry signals themselves, however, and thus are not part of the composite signal. Furthermore, the wavelength accuracy and precision of each channel within either of the two calibration channel sets 1204a–1204b is chosen so as to be greater than that of the information-carrying channels 1202. The inter-channel spacing of the calibration channels 1204a–1204b need not be the same as that of the signal carrying channels 1202. Since the absolute positions, in either wavelength or frequency, of the calibration channels 1204a–1204b are precisely known, their measured positions, as determined by the OPM 400, provide information on drift of the OPM 400. This information is utilized as described below.

Figure 13:
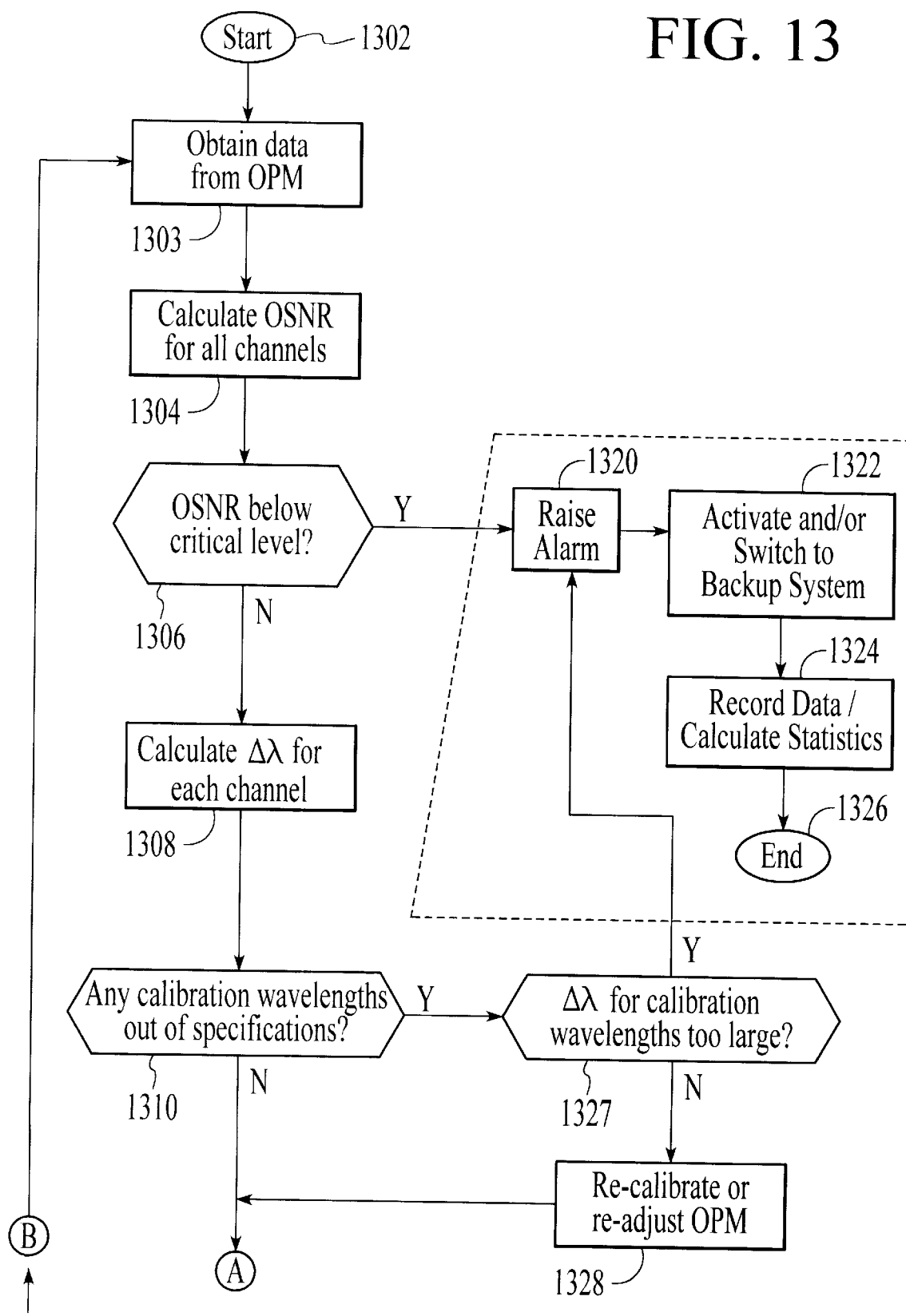
FIG. 13 is a flow chart illustrating a preferred embodiment of a method for utilizing an optical performance monitor in accordance with the present invention to monitor the performance of an optical communications network.

FIG. 13 is a flow chart illustrating a method for utilizing an OPM to adjust the performance of an optical communications network in accordance with the present invention. This method may be undertaken as a computer program in a computer interfaced to the OPM 400 or else by other electronic control hardware and firmware interfaced to the OPM 400. The method comprises an initialization step 1302 followed by a loop through a sequence of steps 1303 through 1318. The initialization step 1302 is executed when optical transmission through the network is first started or when the OPM 400 is first turned on.

Next, data is generated and read from the OPM data, via step 1303. In step 1303, hardware, software, and electronic steps necessary to generate the data points corresponding to a complete spectrum of the data, such as the spectrum shown in FIG. 3, are performed. In the preferred embodiment of the OPM 400, step 1303 would comprise optical detection, optional digitization, and electronic transfer of all the data points associated with at least one complete cycling of switch 408 and switch 412 (FIG. 4) through all possible combinations of their settings. This set of operations may be performed a single time or numerous times before proceeding to step 1304. In the latter case, the information from several data read operations of the OPM 400 might be time-averaged to provide better sampling statistics. The set of data points generated and read in step 1303 are used in the subsequent calculations, as described below.

Next, the minimum OSNR for all signal channels is calculated from the OPM data, via step 1304. The OSNR of any channel is related to the ratio of the optical power level transmitted at the center of the channel passband to that measured at the center of the isolation or stop band. For instance, referring to FIG. 3, the OSNR is related to the ratio between the intensities of data points 306 and the data points 302 at the nominal pass band and isolation band centers, respectively.

The calculated minimum OSNR for the signal channels is then compared to a predetermined critical or minimum OSNR, via step 1306. If the minimum calculated OSNR is less than the critical value, then the OSNR is too low for reliable data transfer on at least one optical channel. In this case, steps 1320, 1322, and 1324 are performed. These steps comprise raising an alarm, via step 1320, activating and switching to a backup communication system or network or to backup transmitters for channels with too low OSNR's, via step 1322, recording and calculating raw data and network statistics, via step 1324, and terminating the flow of control, via step 1326. In step 1322, if a backup system is activated, then an electrical Bit Error Ratio (BER) or Eye Diagram Analysis (EDA) calculation is performed using monitoring components within the backup system.

If the minimum calculated OSNR is not less than the critical value, then the wavelength of each information carrying and calibration channel is calculated from the data from the OPM. These calculated wavelengths are related in the preferred embodiment, for instance, to the measured positions of the maxima in the curve of FIG. 3. The values of the calculated wavelengths of the calibration channels are then compared to their nominal values via step 1310. Because the wavelengths of the calibration channels are more accurate and precise than the measurement precision of the OPM 400, then any difference between the calculated and nominal values of the calibration wavelengths is related to drift in the OPM 400. If the calculated wavelengths of the calibration channels are within predetermined specifications, then proceed to step 1312. However, if any of these calculated wavelengths are not within specifications, as determined in step 1310, then the OPM measurements are in error and the method branches to step 1327. Sufficiently small errors or drifts of the OPM can be compensated by re-calibration and/or re-adjustment of the OPM. However, large errors in the values of the calibration wavelengths, as determined by the OPM, signify that the OPM results are too much in error to be reliable. Therefore, the magnitude of the error, in the determined wavelengths of the calibration channels is compared to some pre-determined critical value in step 1327. If the magnitude of the wavelength error is greater than or equal to this critical value for one or more calibration channels, then the method branches to steps 1320–1326, in which an alarm is raised, a backup system (or OPM) is activated, data and/or statistics are recorded, and the method terminates. Otherwise, the method proceeds to step 1328, in which simple re-calibration and/or re-adjustment of the OPM is performed so as to bring the determined wavelengths for all calibration channels substantially back to their correct values. Re-calibration is the operation of calculating and updating mathematical parameters to be used in subsequent determinations of channel wavelengths so as to ensure that such determinations, as subsequently made by the OPM 400, are correct. Re-adjustment is the operation of adjusting some physical aspect of the OPM 400 (such as, for instance, its temperature) such that the measured values of the calibration wavelengths are brought back to their nominal values following such adjustment.

Next, the values of the calculated wavelengths of the information carrying channels are compared to their nominal specification values, via step 1312. The difference between the calculated wavelength and the nominal wavelength of any channel is herein referred to as the wavelength offset for the channel. If the absolute magnitude of the wavelength offset for the channel is too great, then the channel is operating outside of its wavelength specifications. If none of the wavelengths of the information carrying channels are outside their respective specifications, then proceed to step 1314. However, if one or more wavelengths of these channels are not within their specifications, then a system correction needs to be made, via steps 1332–1340.

In step 1332, the number of channels which are outside of their wavelength specifications is determined. If the number of such channels with out-of-specification wavelengths is less than a certain pre-determined value, then it is assumed that the light sources corresponding to the out-of-specification channels are not wavelength compliant and, accordingly, adjustment signals are transmitted to only the light sources, via step 1334, such that the wavelengths of the channels are brought back within their respective specifications in response to the adjustment signals. The adjustment signals may be transmitted to the non-wavelength-compliant light sources via the same optical communications system being monitored or else via some other optical, electronic, radio frequency or other signal transmitting means.

If the number of channels with out-of-specification wavelengths is determined in step 1332 to be greater than or equal to the pre-determined value, then it is not possible to reliably determine the exact identity and number of components within the optical communication system that are performing outside of their specifications. Such non-compliant components may include one or more light sources or other system components. In this case, a "best fit" wavelength correction set is calculated, via step 1336. Highly accurate and precise light sources are required for the calibration channels in order for the results of this step to be valid. This best-fit wavelength correction set is determined through a pre-determined mathematical formula designed to simultaneously adjust the wavelengths of all channels so as to bring the set or comb of channel wavelengths as close as possible to their nominal values simultaneously. The best-fit correction is based upon minimization of some metric determined from the measured values of the wavelengths of all the data carrying channels. For example, the metric may be chosen as the sum of the absolute values of the wavelength offsets of all channels. As another example, the metric may be chosen as the sum of the squares of the wavelength offsets of all channels. In the preferred embodiment, based upon the value of the metric, a set of wavelength adjustments are calculated via step 1336 such that, with the adjustments, the metric is minimized. Then, the calculated adjustments are applied to all signal light sources, via step 1338. These adjustment signals are generated and transmitted in the same way as previously described for step 1334. Next, an alarm is raised to alert network operations personnel to the existence of out-of-specification wavelengths, via step 1340.

Next, the values of the optical power levels of all of the information carrying channels are calculated, via step 1314. In the preferred embodiment, for instance, these calculated optical power levels are related to the differences in measured intensities between the maxima and minima of the curve in FIG. 3. These calculated optical power levels are then compared to their nominal specification values, via step 1316. The difference between the calculated and the nominal optical power of any channel is herein referred to as the power offset p for the channel. If the absolute magnitude of the power offset is too great for a particular channel, then the optical power level for the channel is outside of its respective specification. If none of the optical power levels of these information carrying channels are outside their respective specifications, then proceed to step 1318. If, however, one or more optical power levels of the information channels are not within their specifications, then a system correction needs to be made, via steps 1344–1352. In step 1344, the number of channels which are outside of their optical power specifications is determined. If the number of such channels with out-of-specification optical powers is less than a certain pre-determined value, then it is assumed that the light sources corresponding to the out-of-specification channels are not operating at their correct power levels and, accordingly, adjustment signals are transmitted to the specific non-compliant light sources, via step 1346, such that the power levels of the channels are brought back within their respective specifications in response to the adjustment signals. The adjustment signals may be transmitted to the off-power light sources via the same optical communications system being monitored or else via some other optical, electronic, radio frequency or other signal transmitting means.

If the number of channels whose power levels are not within specifications is determined in step 1344 to be greater than or equal to said pre-determined value, then it is not possible to reliably determine the exact identity and number of components within the optical communication system that are performing outside of their specifications. In this case, a "best fit" power correction set is calculated, via step 1348. This best-fit wavelength correction set is determined through a pre-determined mathematical formula designed to bring the measured power levels of all channels as close as possible to their nominal values simultaneously. Based upon the results of this calculation, a set of power-level-related adjustments are calculated. These adjustments may be made to either the light sources, to a variable optical attenuator, to a gain flattening device, or to some other network component or set of components. The calculated adjustments are then applied in a coordinated fashion to the appropriate network components, via step 1350. These adjustment signals are generated and transmitted in the same way as previously described. Then, an alarm is raised to alert network operations personnel to the existence of channels whose power levels are not within specifications, via step 1352.

Next, various data and/or statistics related to optical system performance are generated and/or displayed and/or recorded, via step 1318. It is to be noted that similar operations are performed in step 1324. These data and/or statistics are in a form, such as a computer-readable database, that is suitable for real-time or subsequent generation of charts, graphs, histograms, or the like for the display and analysis of long or short term variations and trends in the system performance. Such data may include, but are not necessarily limited to, time and date, number of data carrying channels, the bit transfer rates of the various channels, any calibrations or adjustments to the OPM 400, measured wavelengths and optical power levels of all channels, wavelength and power deviations and/or drifts of all channels, OSNR of each channel, drift of the OPM, any generated alarms, and any adjustments sent to light sources, variable optical attenuators, or other network components. Preferably, these data and/or statistics are generated upon each loop through steps 1303–1352 and may be recorded and/or displayed in real time.

After recording and calculating data and statistics in step 1318, a decision step 1354 is implemented based upon the results of these calculations. Within the decision step 1354, an evaluation of the system optical performance is performed based upon various combinations of the data. If all such calculated results, wherein each result is based upon some combination of data values, are within respective pre-determined acceptable ranges, then the method returns to step 1303 and the looped sequence is repeated. If, however, one of the calculated results is not within its respective pre-determined acceptable range, then the sequence of steps 1356–1360 is performed, wherein an alarm is raised, a backup communications system is activated, and the method is terminated. As an example, one such combination of data might comprise the set of optical power deviations of one or more channels over the course of many successive measurements. This set or combination of data provides information on the frequency and severity of power fluctuations in the system. A second example of a combination of data with system performance implications is the combined set of optical power deviations and OSNR's over the course of time. From this data set, information on long or short term changes in signal quality and predictions of bit-error ratios can be derived. A final example of an important combination of data is the combined set of wavelength deviations, optical power deviations, and OSNR's over time. From this data set, information signal quality deviations caused by wavelength drifts and/or power fluctuations can be calculated. In each such example, the derived information may be utilized as all or part of the input upon which a decision in step 1354 is based.

In the looped sequence of main steps 1303–1318, not all steps need to be performed in the sequence shown and not all steps need to be performed during each iteration. However, step 1303 is required to be the first step of every iteration. Furthermore, step 1308 needs to be performed before either steps 1310, 1312 or 1318, and step 1314 needs to be performed before either steps 1316 or 1318. Likewise, not all of steps 1320–1326, 1332–1340, or 1344–1352 need to be performed in the exact sequence shown. However, step 1326 needs to be performed after steps 1320–1324; step 1332 needs to be performed before steps 1334–1340; and step 1344 needs to be performed before steps 1346–1352.

A method and system for a monitoring a composite optical signal in a fiber optic network has been disclosed. The method and system of the present invention utilizes an optical performance monitor which is able to obtain the entire spectrum in a matter of milliseconds and is limited by optical switching speed or computing power or speed. The preferred embodiment of the optical performance monitor utilizes cascaded channel separator modules to separate sets of data points of the composite optical signal and transfer these data points to a device for analysis. The method and system of the present invention is faster than conventional performance monitors. Because the optical performance monitor of the present invention allows the spectrum to be obtained in fractions of a second, real-time performance monitoring is provided. The optical performance monitor may be combined with another device in the optical network to control the performance of the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optical performance monitor (OPM), comprising:
   a plurality of separator modules for separating a composite optical signal into a plurality of subsets, each of the plurality of subsets comprising a plurality of data points;
   a detector optically coupled to the plurality of separator modules for detecting the plurality of data points;
   a coarse wavelength division multiplexer (CWDM) optically coupled between the plurality of separator modules and the detector for dividing each of the plurality of subsets into a plurality of coarse bands;
   a first switch coupled between the plurality of separator modules and the CWDM for directing each of the plurality of subsets from the plurality of separator modules to the CWDM; and
   a second switch coupled between the CWDM and the detector for directing each of the plurality of coarse bands from the CWDM to the detector.

2. An optical performance monitor (OPM), comprising:
   a plurality of separator modules for separating a composite optical signal into a plurality of subsets, each of the plurality of subsets comprising a plurality of data points; and
   a detector optically coupled to the plurality of separator modules for detecting the plurality of data points, wherein the detector comprises:
   a virtually imaged phased array, and
   a plurality of receivers optically coupled to the virtually imaged phased array.

3. A system for monitoring a composite optical signal, comprising:

a plurality of optical fibers for transmitting the composite optical signal; and at least one optical performance monitor (OPM) coupled to one or more of the plurality of optical fibers, wherein the OPM comprises:
- a plurality of separator modules for separating the composite optical signal into a plurality of subsets, each subset comprising a plurality of data points,
- a detector optically coupled to the plurality of separator modules for detecting the plurality of data points,
- a coarse wavelength division multiplexer (CWDM) optically coupled between the plurality of separator modules and the detector for dividing each of the plurality of subsets into a plurality of coarse bands,
- a first switch coupled between the plurality of separator modules and the CWDM for directing each of the plurality of subsets from the plurality of separator modules to the CWDM, and
- a second switch coupled between the CWDM and the detector for directing each of the plurality coarse bands from the CWDM to the detector.

4. A system for monitoring a composite optical signal, comprising:

a plurality of optical fibers for transmitting the composite optical signal; and at least one optical performance monitor (OPM) coupled to one or more of the plurality of optical fibers, wherein the OPM comprises:
- a plurality of separator modules for separating the composite optical signal into a plurality of subsets, each subset comprising a plurality of data points, and
- a detector optically coupled to the plurality of separator modules for detecting the plurality of data points, wherein the detector comprises:
  - a virtually imaged phased array, and
  - a plurality of receivers optically coupled to the virtually imaged phased array.

5. A system for monitoring a composite optical signal, comprising:

a plurality of optical fibers for transmitting the composite optical signal;

at least one optical performance monitor (OPM) coupled to one or more of the plurality of optical fibers;

a variable optical attenuator coupled to at least one of the plurality of optical fibers; and a communications link coupled between the variable optical attenuator and the OPM.

6. An optical performance monitor (OPM), comprising:

a plurality of separator modules for separating a composite optical signal into a plurality of subsets, each subset comprising a plurality of data points, the plurality of separator modules at least partly arranged in a multi-stage parallel cascade configuration;

a detector optically coupled to the plurality of separator modules for detecting the plurality of data points;

a coarse wavelength division multiplexer (CWDM) optically coupled between the plurality of separator modules and the detector for dividing each of the plurality of subsets into a plurality of coarse bands;

a first switch coupled between the plurality of separator modules and the CWDM for directing each of the plurality of subsets from the plurality of separator modules to the CWDM; and a second switch coupled between the CWDM and the detector for directing each of the plurality coarse bands from the CWDM to the detector.

7. An optical performance monitor (OPM), comprising:

a plurality of separator modules for separating a composite optical signal into a plurality of subsets, each subset comprising a plurality of data points, the plurality of separator modules at least partly arranged in a multi-stage parallel cascade configuration; and a detector optically coupled to the plurality of separator modules for detecting the plurality of data points, wherein the detector comprises:
- a virtually imaged phased array, and
- a plurality of receivers optically coupled to the virtually imaged phased array.

8. A system for monitoring a composite optical signal, comprising:

a plurality of optical fibers for transmitting the composite optical signal; and at least one optical performance monitor (OPM) coupled to one or more of the plurality of optical fibers, the OPM comprising:
- a plurality of separator modules for separating the composite optical signal into a plurality of subsets, each subset comprising a plurality of data points,
- a detector optically coupled to the plurality of separator modules for detecting the plurality of data points,
- a coarse wavelength division multiplexer (CWDM) optically coupled between the plurality of separator modules and the detector for dividing each of the plurality of subsets into a plurality of coarse bands,
- a first switch coupled between the plurality of separator modules and the CWDM for directing each of the plurality of subsets from the plurality of separator modules to the CWDM, and
- a second switch coupled between the CWDM and the detector for directing each of the plurality coarse bands from the CWDM to the detector.

9. A system for monitoring a composite optical signal, comprising:

a plurality of optical fibers for transmitting the composite optical signal; and at least one optical performance monitor (OPM) coupled to one or more of the plurality of optical fibers, the OPM comprising:
- a plurality of separator modules for separating the composite optical signal into a plurality of subsets, each subset comprising a plurality of data points, and
- a detector optically coupled to the plurality of separator modules for detecting the plurality of data points, wherein the detector comprises:
  - a virtually imaged phased array, and
  - a plurality of receivers optically coupled to the virtually imaged phased array.

10. A system for monitoring a composite optical signal, comprising:

a plurality of optical fibers for transmitting the composite optical signal;

at least one optical performance monitor (OPM) coupled to one or more of the plurality of optical fibers, the OPM comprising:
- a plurality of separator modules for separating the composite optical signal into a plurality of subsets, each subset comprising a plurality of data points, and
- a detector optically coupled to the plurality of separator modules for detecting the plurality of data points;

a variable optical attenuator coupled to at least one of the plurality of optical fibers; and a communications link coupled between the variable optical attenuator and the OPM.

11. An optical performance monitor (OPM), comprising:

a plurality of separator modules for separating a composite optical signal into a plurality of subsets, each subset comprising a plurality of data points, the plurality of separator modules at least partly arranged in a multi-stage parallel cascade configuration;

a coarse wavelength division multiplexer (CWDM) optically coupled to the plurality of separator modules for dividing each of the plurality of subsets into a plurality of coarse bands;

a detector optically coupled to the CWDM for detecting the plurality of data points in the plurality of coarse bands;

a first switch coupled between the plurality of separator modules and the CWDM for directing each of the plurality of subsets from the plurality of separator modules to the CWDM; and a second switch coupled between the CWDM and the detector for directing each of the plurality coarse bands from the CWDM to the detector.

12. An optical performance monitor (OPM), comprising:

a plurality of separator modules for separating a composite optical signal into a plurality of subsets, each subset comprising a plurality of data points, the plurality of separator modules at least partly arranged in a multi-stage parallel cascade configuration;

a coarse wavelength division multiplexer (CWDM) optically coupled to the plurality of separator modules for dividing each of the plurality of subsets into a plurality of coarse bands; and a detector optically coupled to the CWDM for detecting the plurality of data points in the plurality of coarse bands, wherein the detector comprises:
a virtually imaged phased array, and
a plurality of receivers optically coupled to the virtually imaged phased array.

13. A system for monitoring a composite optical signal, comprising:

a plurality of optical fibers for transmitting the composite optical signal; and at least one optical performance monitor (OPM) coupled to one or more of the plurality of optical fibers, the OPM comprising:
a plurality of separator modules for separating the composite optical signal into a plurality of subsets, each subset comprising a plurality of data points,
a coarse wavelength division multiplexer (CWDM) optically coupled to the plurality of separator modules for dividing each of the plurality of subsets into a plurality of coarse bands,
a detector optically coupled to the CWDM for detecting the plurality of data points in the plurality of coarse bands,
a first switch coupled between the plurality of separator modules and the CWDM for directing each of the plurality of subsets from the plurality of separator modules to the CWDM, and
a second switch coupled between the CWDM and the detector for directing each of the plurality coarse bands from the CWDM to the detector.

14. A system for monitoring a composite optical signal, comprising:

a plurality of optical fibers for transmitting the composite optical signal; and at least one optical performance monitor (OPM) coupled to one or more of the plurality of optical fibers, the OPM comprising:
a plurality of separator modules for separating the composite optical signal into a plurality of subsets, each subset comprising a plurality of data points,
a coarse wavelength division multiplexer (CWDM) optically coupled to the plurality of separator modules for dividing each of the plurality of subsets into a plurality of coarse bands, and
a detector optically coupled to the CWDM for detecting the plurality of data points in the plurality of coarse bands, wherein the detector comprises:
a virtually imaged phased array, and
a plurality of receivers optically coupled to the virtually imaged phased array.

15. A system for monitoring a composite optical signal, comprising:

a plurality of optical fibers for transmitting the composite optical signal;

at least one optical performance monitor (OPM) coupled to one or more of the plurality of optical fibers, the OPM comprising:
a plurality of separator modules for separating the composite optical signal into a plurality of subsets, each subset comprising a plurality of data points,
a coarse wavelength division multiplexer (CWDM) optically coupled to the plurality of separator modules for dividing each of the plurality of subsets into a plurality of coarse bands, and
a detector optically coupled to the CWDM for detecting the plurality of data points in the plurality of coarse bands;

a variable optical attenuator coupled to at least one of the plurality of optical fibers; and a communications link coupled between the variable optical attenuator and the OPM.

* * * * *